Patented July 22, 1930

1,771,096

UNITED STATES PATENT OFFICE

FREDERICK H. PENN, OF DALLAS, TEXAS

PROCESS OF RESOLVING EMULSIONS

No Drawing. Application filed September 2, 1926. Serial No. 133,304.

This invention relates to processes of and reagents for breaking or resolving emulsions of mineral oil and water.

I have discovered that salts comprising a weak base and a strong acid have the capacity of resolving numerous petroleum oil and water emulsions encountered in different oil fields, and that such action is in many cases improved by the employment therewith of alkali metal and alkaline earth metal bases, as for example, sodium hydroxid, potassium hydroxid, calcium hydroxid and the like. The salt comprising a weak base and a strong acid which I prefer to employ is ammonium chlorid, although the other salts of this class may be employed, as for example, ammonium sulphate and ammonium phosphate.

I also have discovered that I may advantageously employ in connection with one or more ingredients of my resolving reagent or in fact, any mineral oil and water deemulsifying reagents which are insoluble or sparingly soluble in one or both phases of such emulsions a small amount of a solvent of such ingredient or reagent, such as alcohol, which solvent also is a solvent of the phase or phases of the emulsion in which such ingredient is insoluble or but sparingly soluble and in this way obtain a desired degree of solvency of such ingredient or reagent in the phase or phases of the emulsion in which it is normally insoluble or but sparingly soluble.

Numerous salts of weak bases with strong acids are insoluble or but slightly soluble in petroleum oil. This is true of ammonium chlorid, and numerous other materials capable of resolving mineral oil and water emulsions but for their lack of ready solubility in the continuous phase or in both phases of such emulsions, but such salts are soluble in alcohol which also is a solvent of both phases of such emulsions. Similarly, numerous alkali metal and alkaline earth metal hydroxids which I propose to employ as auxiliary reagents with the salt of a weak base with a strong acid, such for example, as sodium hydroxid are practically insoluble in petroleum oil but soluble in alcohol. By the employment therefore of my principal reagent either alone or with the auxiliary reagents referred to or any potential deemulsifying agent insoluble or but sparingly soluble in the continuous phase or in both phases of the emulsion in connection with a solvent of the mineral oil or such oil and water in which solvent such ingredients or reagents are themselves soluble, such ingredients or reagents are rendered soluble in the mineral oil or in both the mineral oil and water and the emulsion is readily and rapidly or more readily and rapidly resolved by reason of such solubility or increased solubility of such ingredient or reagents.

In the practice of my invention I prefer to employ as the salt made up of a weak base and a strong acid, sal ammoniac and I prefer to employ therewith sodium hydroxid or potassium hydroxid or both in the preferred proportions of two parts by weight of ammonium chlorid and ten parts by weight of sodium hydroxid or where both sodium and potassium hydroxids are employed two parts by weight of ammonium chlorid ten parts by weight of sodium hydroxid and five parts by weight of potassium hydroxid. To the sal ammoniac alone or to the mixture of sal ammoniac and alkali metal hydroxid or hydroxids I prefer to add a solvent of the materials referred to which is also a solvent of the phase or phases of the emulsion in which such materials are insoluble or sparingly soluble and the solvent which I prefer to employ is commercial grain alcohol preferably employed in the proportions of 10 parts by weight of the alcohol to 100 parts by weight of the ammonium chlorid or 100 parts by weight of the mixture of ammonium chlorid and alkali metal hydroxid or hydroxids. To the reagent or reagents is also added sufficient water ordinarily two times the weight of the alcohol employed, to effect their complete solution in the dilute alcohol and such resulting solution is added to the emulsion in the usual way and maintained in contact therewith until the emulsion is resolved.

It is to be understood that the proportions given while preferred, are not essential to the practice of the invention and may be widely varied. For example, the proportions of the compound of a weak base and a strong acid to the alkali metal or alkaline earth metal hyroxid or hydroxids where such auxiliary reagents are employed, may be widely varied and the proportion of the alcohol to the resolving reagent or reagents may similarly be widely varied. When more than one resolving reagent is employed the proportions of the resolving reagents to obtain the best results in the treatment of any particular emulsions can advantageously be determined by the treatment of test samples it being impossible to tell in advance what proportions of the resolving ingredients will give the best results in the treatment of any particular emulsion without some experimental test, although the proportions given have been found to be the most satisfactory for resolving numerous emulsions. Ordinarily 10 per cent by weight of the solvent is sufficient to render the resolving reagent or reagents sufficiently soluble in the continuous phase or in both phases of the emulsion for effective use. It will be understood, however, that by increasing the proportion of alcohol employed the solubility of the resolving reagents in the continuous phase or in both phases of the emulsions will be increased and the action of such resolving agents rendered more rapid. The preferred quantity of my reagent to be employed in the treatment of any particular emulsion may advantageously be determined by test but the practice common in this art in the use of deemulsifying agents may be followed and satisfactory results obtained although I prefer to employ generally a somewhat smaller amount of my reagent than is ordinarily used in the case of other deemulsifying compositions.

It will be understood by those skilled in this art that in every case sufficient of my reagent is to be used to completely resolve the emulsion under treatment and that the addition of an additional amount will increase the rapidity of the deemulsification but at an increased expense for the resolving reagent.

It also is to be understood that a deemulsifying agent slightly but not readily soluble in one or both phases of an emulsion can be employed to slowly resolve the emulsion even without the addition of the solvent hereinbefore referred to but that the resolving action is much more rapid and accordingly satisfactory in practice where the solvent also is employed.

While I have described in detail the practice of my process, it is to be understood that such detailed descriptions is merely illustrative of the principle of my invention and its preferred practice and that the spirit and scope of the invention is not limited thereto except as set forth in the appended claims.

I claim:

1. The process of resolving mineral oil and water emulsions comprising adding thereto a potential deemulsifying reagent comprising a salt made up of a weak base and a strong acid and an alkali metal hydroxid and causing such reagent to act upon the emulsion until such emulsion is resolved.

2. The process of resolving mineral oil and water emulsions comprising adding thereto a potential deemulsifying reagent not readily soluble in the continuous phase of the emulsion comprising a salt made up of a weak base and a strong acid, an alkali metal hydroxid and a solvent of such reagent which solvent is a solvent for mineral oil and causing such reagent to act upon the emulsion until such emulsion is resolved.

3. The process of resolving mineral oil and water emulsions comprising adding thereto a potential deemulsifying reagent not readily soluble in the continuous phase of the emulsion comprising a salt made up of a weak base and a strong acid, an alkali metal hydroxid and alcohol and causing such reagent to act upon the emulsion until such emulsion is resolved.

4. The process of resolving mineral oil and water emulsions comprising adding thereto ammonium chlorid and causing such reagent to act upon the emulsion until such emulsion is resolved.

5. The process of resolving mineral oil and water emulsions comprising adding thereto ammonium chlorid and sodium hydroxid and causing such reagent to act upon the emulsion until such emulsion is resolved.

6. The process of resolving mineral oil and water emulsions comprising adding thereto a deemulsifying reagent comprising ammonium chlorid, sodium hydroxid and alcohol, and causing such reagent to act upon the emulsion until such emulsion is resolved.

7. The process of resolving mineral oil and water emulsions comprising adding thereto an ammonium salt of a strong acid and a solvent of the salt, which solvent is a solvent for mineral oil, and causing such reagent to act upon the emulsion until such emulsion is resolved.

8. The process of resolving mineral oil and water emulsions comprising adding thereto an ammonium salt of a strong acid and alcohol, and causing such reagent to act upon the emulsion until such emulsion is resolved.

9. The process of resolving mineral oil and water emulsions comprising adding thereto ammonium chlorid and alcohol, and causing such reagent to act upon the emulsion until such emulsion is resolved.

10. The process of resolving mineral oil and water emulsions comprising adding thereto an ammonium salt of a strong acid and causing such reagent to act upon the emulsion until such emulsion is resolved.

In testimony whereof I affix my signature.

FREDERICK H. PENN.